(12) United States Patent
Zheng et al.

(10) Patent No.: US 10,768,365 B2
(45) Date of Patent: Sep. 8, 2020

(54) ENABLING THERMAL EFFICIENCY ON A SILICON-ON-INSULATOR (SOI) PLATFORM

(71) Applicant: Futurewei Technologies, Inc., Plano, TX (US)

(72) Inventors: Dawei Zheng, Irvine, CA (US); Ge Yi, San Ramon, CA (US); Li Yang, San Jose, CA (US); Xiao Shen, San Bruno, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/927,290

(22) Filed: Mar. 21, 2018

(65) Prior Publication Data

US 2019/0293863 A1    Sep. 26, 2019

(51) Int. Cl.
| | |
|---|---|
| *G02B 6/122* | (2006.01) |
| *G02B 6/136* | (2006.01) |
| *G02B 6/132* | (2006.01) |
| *G02B 6/12* | (2006.01) |

(52) U.S. Cl.
CPC ............ *G02B 6/122* (2013.01); *G02B 6/132* (2013.01); *G02B 6/136* (2013.01); *G02B 2006/12061* (2013.01); *G02B 2006/12142* (2013.01)

(58) Field of Classification Search
None
See application file for complete search history.

(56) References Cited

U.S. PATENT DOCUMENTS

| | | | |
|---|---|---|---|
| 6,369,931 B1 | 4/2002 | Funk et al. | |
| 7,848,599 B2 * | 12/2010 | Cunningham | G02F 1/025 385/1 |
| 9,678,273 B2 * | 6/2017 | Hofrichter | G02B 6/24 |
| 2005/0169566 A1 * | 8/2005 | Takahashi | G02F 1/011 385/1 |

(Continued)

FOREIGN PATENT DOCUMENTS

| | | |
|---|---|---|
| CN | 102478686 A | 5/2012 |
| CN | 103033880 A | 4/2013 |
| JP | 2004198116 A | 7/2004 |

OTHER PUBLICATIONS

Williams, et al., "Etch Rates for Micromachining Processing," Journal of Microelectromechanical Systems, vol. 5, No. 4, Dec. 1996, pp. 256-269.

(Continued)

*Primary Examiner* — Tina M Wong
(74) *Attorney, Agent, or Firm* — Conley Rose, P.C.

(57) ABSTRACT

A method for fabricating a photonic integrated circuit (PIC) comprises providing a silicon-on-insulator (SOI) wafer comprising an insulator layer disposed between a base semiconductor layer and a SOI layer, wherein the SOI layer comprises a waveguide, providing at least one slot within the SOI layer, wherein the at least one slot is positioned on the same or opposite sides of the waveguide, and wherein the at least one slot is positioned at a predetermined distance away from the waveguide, and removing a portion of the insulator layer to form an etched-out portion of the insulator layer, wherein the etched-out portion is positioned directly beneath the waveguide, and wherein a width of the etched-out portion is at least the width of the waveguide.

20 Claims, 10 Drawing Sheets

(56) References Cited

U.S. PATENT DOCUMENTS

| | | | |
|---|---|---|---|
| 2006/0096944 A1 | 5/2006 | Metzger et al. | |
| 2009/0274418 A1* | 11/2009 | Holzwarth | B82Y 20/00 |
| | | | 385/30 |
| 2012/0280345 A1* | 11/2012 | Zhu | G02B 6/1226 |
| | | | 257/432 |
| 2014/0376857 A1* | 12/2014 | Chantre | G02B 6/12002 |
| | | | 385/14 |
| 2015/0241631 A1* | 8/2015 | Fish | G02B 6/1221 |
| | | | 385/14 |
| 2015/0253510 A1* | 9/2015 | Celo | G02B 6/3582 |
| | | | 385/14 |
| 2016/0233641 A1* | 8/2016 | Chantre | H01S 5/026 |
| 2017/0227456 A1* | 8/2017 | Tao | G02B 6/122 |
| 2017/0269395 A1* | 9/2017 | Heck | G02B 6/12004 |
| 2018/0203188 A1* | 7/2018 | Parker | H01L 21/76251 |
| 2018/0294622 A1* | 10/2018 | Kurczveil | H01S 5/3013 |
| 2018/0314004 A1* | 11/2018 | Fathpour | G02B 6/132 |
| 2019/0293863 A1* | 9/2019 | Zheng | G02B 6/136 |

OTHER PUBLICATIONS

Machine Translation and Abstract of Chinese Publication No. CN102478686, May 30, 2012, 15 pages.
Machine Translation and Abstract of Chinese Publication No. CN103033880, Apr. 10, 2013, 9 pages.
Machine Translation and Abstract of Japanese Publication No. JP2004198116, Jul. 15, 2004, 21 pages.
Foreign Communication From A Counterpart Application, PCT Application No. PCT/CN2019/078897, English Translation of International Search Report dated Jun. 19, 2019, 5 pages.
Foreign Communication From A Counterpart Application, PCT Application No. PCT/CN2019/078897, English Translation of Written Opinion dated Jun. 19, 2019, 4 pages.

* cited by examiner

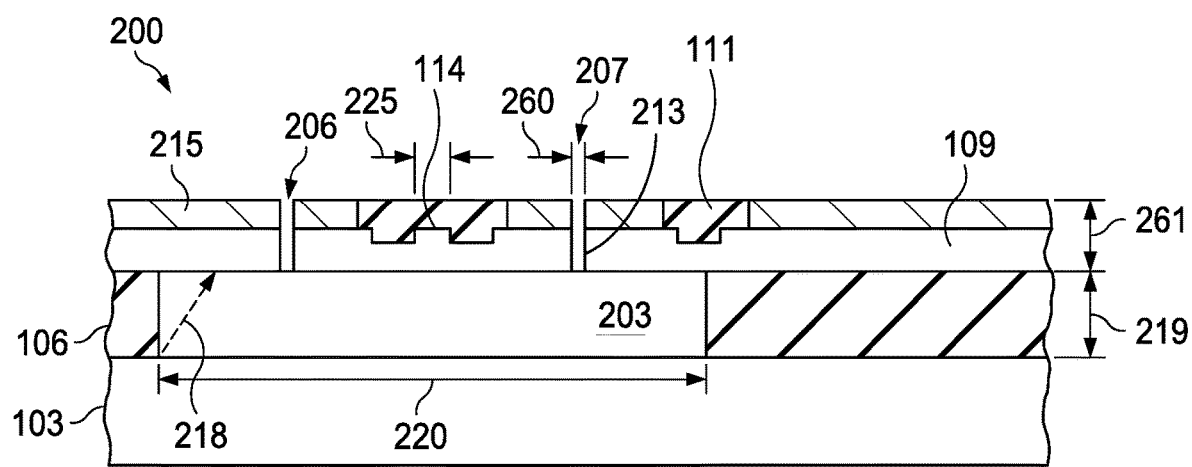
FIG. 2
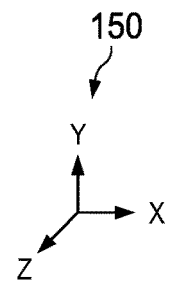

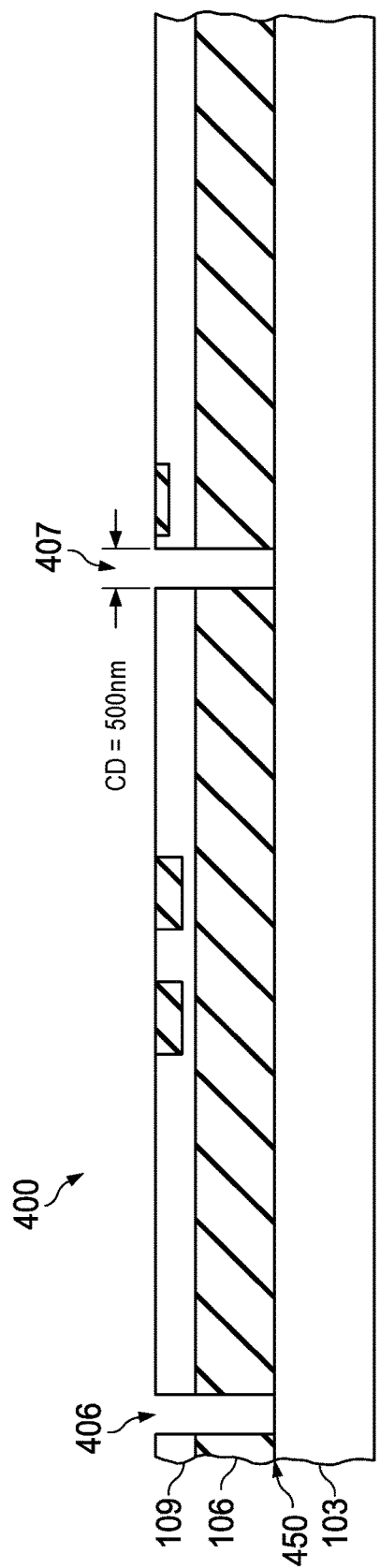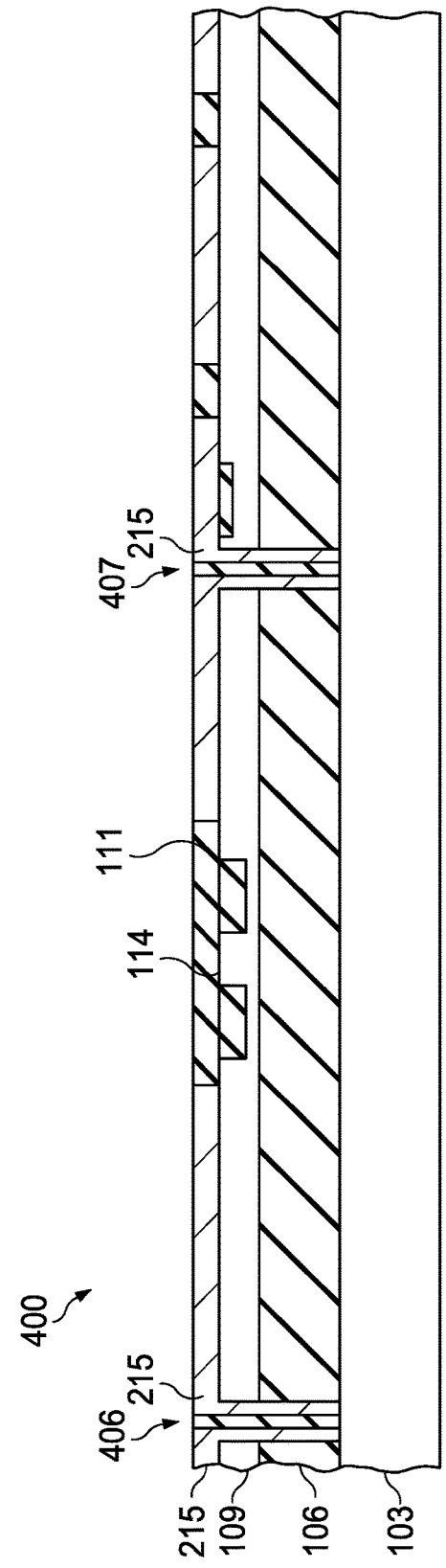

ENABLING THERMAL EFFICIENCY ON A SILICON-ON-INSULATOR (SOI) PLATFORM

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Optical fibers have been widely used for the propagation of optical signals, especially to provide high-speed communication links. Optical links using fiber optics comprise various advantages over electrical links, for example, comparatively large bandwidths, high noise immunity, reduced power dissipation, and minimal crosstalk. Optical signals carried by optical fibers may be processed by a wide variety of optical and/or optoelectronic devices, including integrated circuits.

Photonic integrated circuits (PICs) comprising waveguides are used as optical components in constructing an optical system. In order for a PIC to function as an optical component in an optical system, optical fibers are connected to waveguides formed on the PIC. Thus, photonic integration, or light coupling between optical fibers and waveguides formed on PICs, is becoming increasingly important in optical systems.

SUMMARY

According to one aspect of the present disclosure, there is provided a method for fabricating a photonic integrated circuit (PIC). The method comprises providing a silicon-on-insulator (SOI) wafer comprising an insulator layer disposed between a base semiconductor layer and a SOI layer, wherein the SOI layer comprises a waveguide, providing at least one slot within the SOI layer, wherein the at least one slot is positioned proximate to the waveguide, and wherein the at least one slot is positioned at a predetermined distance away from the waveguide, and removing a portion of the insulator layer to form an etched-out portion of the insulator layer, wherein the etched-out portion is positioned directly beneath the waveguide, and wherein a width of the etched-out portion is at least the width of the waveguide.

Optionally, in any of the preceding aspects, another implementation of the aspect provides that the at least one slot is parallel to the waveguide.

Optionally, in any of the preceding aspects, another implementation of the aspect provides that the method further comprises providing two outer slots into the SOI layer and the insulator layer, and wherein a first outer slot and a second outer slot are positioned at a second predetermined distance away from the waveguide.

Optionally, in any of the preceding aspects, another implementation of the aspect provides that the method further comprises depositing a polysilicon layer on top of the SOI layer and into a first outer slot and a second outer slot, wherein a cladding layer is disposed between the waveguide and the polysilicon layer.

Optionally, in any of the preceding aspects, another implementation of the aspect provides that the method further comprises etching out portions of the SOI layer around the waveguide.

Optionally, in any of the preceding aspects, another implementation of the aspect provides that the method further comprises depositing a cladding layer on top of the SOI layer, and depositing a polysilicon layer on top of the cladding layer.

Optionally, in any of the preceding aspects, another implementation of the aspect provides that wherein the portion of the insulator layer is removed to form the etched-out portion using a buffered oxide etch (BOE).

Optionally, in any of the preceding aspects, another implementation of the aspect provides that the at least one slot extends vertically from a top surface of the SOI wafer to a top surface of the insulator layer.

According to one aspect of the present disclosure, there is provided a PIC prepared by a process comprising the steps of providing a silicon-on-insulator (SOI) wafer comprising an insulator layer disposed between a base semiconductor layer and a SOI layer, wherein the SOI layer comprises a waveguide, providing at least one slot within the SOI layer, wherein the at least one slot is positioned proximate to the waveguide, and wherein the at least one slot is positioned at a predetermined distance away from the waveguide, and removing a portion of the insulator layer to form an etched-out portion of the insulator layer, wherein the etched-out portion is positioned directly beneath the waveguide, and wherein a width of the etched-out portion is at least the width of the waveguide.

Optionally, in any of the preceding aspects, another implementation of the aspect provides that the at least one slot is formed by reactive-ion etching (RIE).

Optionally, in any of the preceding aspects, another implementation of the aspect provides that the process further comprises providing two outer slots into the SOI layer and the insulator layer, and wherein a first outer slot and a second outer slot are positioned at a second predetermined distance away from the waveguide.

Optionally, in any of the preceding aspects, another implementation of the aspect provides that the process further comprises depositing a polysilicon layer on top of the SOI layer and into the first outer slot and the second outer slot, wherein a cladding layer is disposed between the waveguide and the polysilicon layer.

Optionally, in any of the preceding aspects, another implementation of the aspect provides that the portion of the insulator layer is removed to form the etched-out portion using a buffered oxide etchant (BOE).

Optionally, in any of the preceding aspects, another implementation of the aspect provides that wherein the etched-out portion comprises a vacuum by which heat is unable to pass.

According to one aspect of the present disclosure, there is provided a PIC to be used in an optical device, comprising a base semiconductor layer, an insulator layer disposed on top of the base semiconductor layer, a silicon-on-insulator (SOI) layer comprising a waveguide and disposed on top of the insulator layer, wherein a waveguide is disposed on the SOI layer, and wherein the insulator layer comprises an etched-out portion, wherein the etched-out portion is positioned directly beneath the waveguide, and wherein a width of the etched-out portion is at least the width of the waveguide.

Optionally, in any of the preceding aspects, another implementation of the aspect provides that the PIC further comprises a cladding layer disposed on top of the SOI layer, and a heater disposed on top of the cladding layer, wherein a current is passed through the heater to provide heat to the waveguide.

Optionally, in any of the preceding aspects, another implementation of the aspect provides that the SOI layer comprises a slot proximate to the waveguide.

Optionally, in any of the preceding aspects, another implementation of the aspect provides that the SOI layer comprises two slots on either side of the waveguide.

Optionally, in any of the preceding aspects, another implementation of the aspect provides that the etched-out portion comprises a vacuum by which heat is unable to pass.

Optionally, in any of the preceding aspects, another implementation of the aspect provides that the PIC further comprises two outer slots into the SOI layer and the insulator layer, wherein a first outer slot and a second outer slot are positioned outside the first outer slot and the second outer slot relative to the waveguide, and wherein the first outer slot and the second outer slot are positioned at a second predetermined distance away from the waveguide.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts. It should be understood that the drawings are not necessarily to scale.

FIG. 2 is a cross sectional view of a portion of a SOI wafer that enables thermal efficiency according to an embodiment of the disclosure.

FIGS. 5A-5C collectively illustrate another method for fabricating a PIC with a SOI wafer.

DETAILED DESCRIPTION

It should be understood at the outset that, although illustrative implementations of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

A PIC may be part of an optical modulator that receives light via an optical fiber. Typical PICs include a SOI wafer comprising a buried oxide (BOX) layer disposed between a SOI layer and a base silicon layer. The SOI layer may include two parallel waveguides disposed a distance from each other, where each parallel waveguide carries a part of the light received. In PICs, there is a need to adjust the phase of the light propagating on one waveguide relative to the phase of the light propagating on the other waveguide. The phase may be adjusted by heating one of the waveguides locally using an on-chip resistive heater.

However, generating the amount of heat necessary to adjust the phase of the light propagating on one of the waveguides requires an excessive amount of power, about 10s-100s of milliwatts. In addition, the heat generated by the resistive heater typically dissipates down through all layers of the PIC relatively quickly and easily, instead of staying within the waveguide for a sufficient amount of time to change the phase of the light. Therefore, embodiments of the present disclosure enable PICs to increase thermal resistance within the waveguide by removing a portion of the BOX layer directly under the waveguide being heated.

Figure 1:
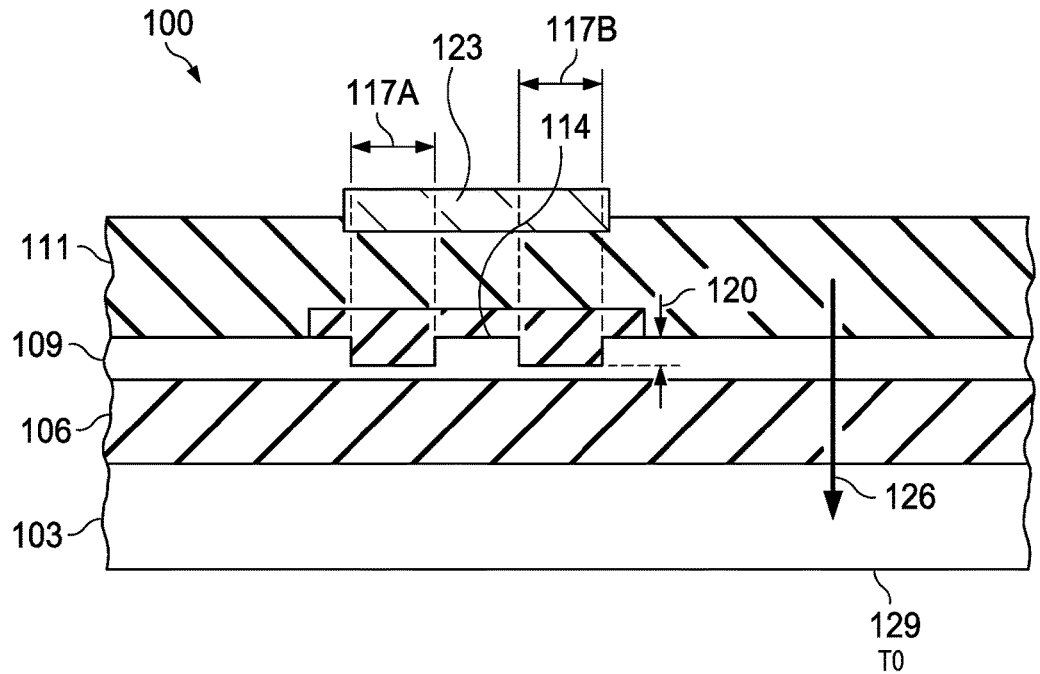
FIG. 1 is a cross sectional view of a portion of a silicon-on-insulator (SOI) wafer included in a PIC.
Figure 1:
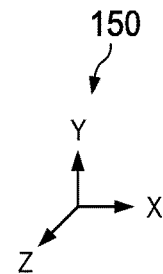

FIG. 1 is a cross sectional view of a portion of a SOI wafer 100 included in a PIC. As defined by the legend 150, the z-axis is along an optical propagation axis of the waveguide 114. The x-axis is substantially parallel to a plane of the SOI wafer 100. The y-axis is substantially perpendicular to the plane of the SOI wafer 100.

The SOI wafer 100 comprises a base semiconductor layer 103, an insulator layer 106, a SOI layer 109, and a cladding layer 111. The insulator layer 106 is disposed between the SOI layer 109 and the base semiconductor layer 103. The cladding layer 111 is disposed on top of the SOI layer 109.

The base semiconductor layer 103 may be a semiconductor substrate formed from silicon, a silicon-containing material, or another suitable substrate material. The bottom portion 129 of the SOI wafer 100 may be the bottom edge of the base semiconductor layer 103. The insulator layer 106, also referred to as the BOX layer, may be formed from silicon dioxide or another suitable insulator. In an embodiment, the insulator layer 106 may have a height of about 2-3 micrometers (μm).

The SOI layer 109 may be formed from silicon or another suitable semiconductor material. In an embodiment, the SOI layer 109 may have a height of 0.2 μm. The SOI layer 109 is used for forming waveguides and any other optical functions. For example, the SOI layer 109 includes a waveguide 114. The waveguide 114 may be formed by, for example, etching away portions 117A and 117B of the SOI layer 109. In an embodiment, the waveguide 114 defines sidewalls 120. While the sidewalls 120 of the SOI layer 109 are depicted as vertical in FIG. 1, it should be appreciated that the sidewalls 120 may be slightly rounded or sloped due to the semiconductor fabrication process.

The SOI layer 109 may be patterned using photolithography and etched using a dry etching process such as reactive-ion etching (RIE). Photolithography is a process that uses light to transfer a geometric pattern from a photo mask to a light-sensitive chemical photoresist (PR) coating on a substrate, such as the SOI layer 109. RIE is a type of dry etching that uses chemically reactive plasma to remove material deposited on a wafer substrate such as the SOI layer 109. For example, a first photo mask (not shown) is generated with a first pattern that defines the waveguide 114 aligning to the z-axis. The photolithography process transfers the first pattern onto the SOI layer 109. The RIE process removes the portions 117A and 117B of the SOI layer 109 according to the transferred first pattern to form the waveguide 114.

The cladding layer 111 may be formed of a material such as silicon oxide ($SiO_x$), silicon nitride ($SiN_x$), silicon carbide (SiC), silicon carbonitride (SiCN) or another suitable material. The cladding layer 111 is disposed over the SOI layer 109 and the waveguide 114. The deposition of the cladding layer 111 is performed in one or more steps to provide a flat surface for the SOI wafer 100. The cladding layer 111 may be disposed only over a portion of the SOI layer 109 such that the waveguide 114 is covered by the cladding layer 111.

Other functional layers may be formed on top of the cladding layer 111. As shown in FIG. 1, a resistive heater 123 may be disposed on top of the cladding layer 111. The resistive heater 123 may be a resistor formed of low resistive material, such as, for example, metal (such as a Titanium Tungsten (TiW) alloy), conductive ceramic (such as a Titanium Nitride (TiN) or a Tantalum Nitride (TaN)) or doped silicon material. While the resistive heater 123 is disposed on top of the cladding layer 111 in FIG. 1, it should be appreciated that the resistive heater 123 may also be placed on the side of the SOI wafer 100.

In operation, the PIC including the SOI wafer 100 may receive light from an external optical fiber (not shown) and split the light into at least two light beams. One of these light beams may pass along waveguide 114 and the other light beam may pass along another reference waveguide (not shown) disposed on the SOI wafer 100. In optical modulation, the phase of one of these light beams needs to be adjusted relative to the phase of the other light beam before both of these light beams can be recombined.

The resistive heater 123 may be used to adjust the phase of the light beam propagating along waveguide 114 by providing heat to the SOI wafer 100. For example, a current may be applied to the resistive heater 123 to generate heat which is passed through the cladding layer 111 and then to the waveguide 114.

However, in typical PICS including SOI wafers 100, the heat does not remain in the waveguide 114 long enough to change the phase of the light beam propagating on waveguide 114 without requiring a large amount of power being applied to the resistive heater 123. This may be because the heat generated by the resistive heater 123 dissipates from the waveguide 114 vertically downwards in the y-axis through the insulator layer 106 and the base semiconductor layer 103 to the bottom portion 129, as shown by arrow 126. Embodiments of the present disclosure provide a SOI wafer 100 that is configured to provide thermal efficiency at the waveguide 114 by removing a portion of the insulator layer 106 below the waveguide 114.

FIG. 2 is a cross sectional view of a portion of a SOI wafer 200 that enables thermal efficiency according to an embodiment of the disclosure. As shown in FIG. 2, SOI wafer 200 is similar to SOI wafer 100, except that SOI wafer 200 includes an etched-out portion 203, slots 206 and 207, and a polysilicon layer 215. Otherwise, SOI wafer 200 also includes a base semiconductor layer 103, an insulator layer 106, a SOI layer 109, and one or more cladding layers 111.

For example, SOI wafer 200 is a cross sectional view of a portion of the SOI wafer 100 after patterning and etching to remove the etched-out portion 203 and the slots 206 and 207.

The polysilicon layer 215 is disposed on top of the SOI layer 109 or the cladding layer 111. The cladding layer 111 acts as a buffer between the SOI layer 109 and the polysilicon layer 215, and the cladding layer 111 sits between various sections of the polysilicon layer 215. In this way, the cladding layer 111 may be deposited on top of the SOI layer 109, and the polysilicon layer 215 may be deposited on top of the cladding layer 111. The polysilicon layer 215 may be configured to further minimize optical absorption and may be formed of a polysilicon or Silicon Nitride.

In an embodiment, the slots 206 and 207 may be holes or apertures that are patterned into the polysilicon layer 215, the SOI layer 109, and slightly into the insulator layer 106 to facilitate removing a portion of the insulator layer 106. The slots 206 and 207 extend vertically along the y-axis from the top surface of the SOI wafer 200 to the top surface of the insulator layer 106. The slots 206 and 207 may be positioned within the polysilicon layer 215 and the SOI layer 109 on either side of the waveguide 114. The slots 206 and 207 may comprise vertical sidewalls 213, respectively, along the y-axis that are perpendicular to the plane of the SOI wafer 200.

As shown in FIG. 2, the slots 206 and 207 are positioned a predefined distance from the waveguide 114 and do not abut against the waveguide 114. In an embodiment, the slots 206 and 207 are placed an equal distance from the waveguide 114 and on either side of the waveguide 114. In an embodiment, the slots 206 and 207 may be placed at different distances from the waveguide 114. In an embodiment, the slots 206 and 207 are positioned in a manner to facilitate etching out the portion of the insulator layer 106 from directly under the waveguide 114.

While FIG. 2 shows that slots 206 and 207 are positioned on either side of the waveguide 114, slots 206 and 206 may be patterned anywhere proximate to the waveguide 114. For example, slots 206 and 207 do not need to placed equidistance from the waveguide 114. In some embodiments, slots 206 and 207 may be positioned at different distances from the waveguide 114. In some embodiments, slots 207 and 207 may both be positioned on the same side of the waveguide 114.

In some embodiments, only a single slot 206 or 207 may be patterned into the polysilicon layer 215, the SOI layer 109, and slightly into the insulator layer 106. This single slot 206 or 207 may be proximate to the waveguide 114 such that the slot 206 or 207 may be used to remove a portion of the insulator layer 106. In one embodiment, the slots 206 or 207 may propagate, or extend, parallel and in the same direction as the waveguide 114.

In some embodiments, the diameter 260 of the slots 206 and 207 may be wide enough so that dry etch radicals may reach the insulator layer 106 and so that the reaction by-product may leave through the slots 206 and 207. The diameter 260 of the slots 206 and 207 may also be wide enough so that the slots 206 and 207 may be resealed by an oxide deposition. For example, the diameter 260 of the slots 206 and 207 in the x-axis is about 500 nanometers (nm). In some embodiments, the height 261 of the slots 206 and 207 may be substantially equivalent to the height of the polysilicon layer 215 and the SOI layer 109.

In an embodiment, a portion of the insulator layer 106 is removed from the SOI wafer 200 to create the etched-out portion 203. In an embodiment, the portion of the insulator layer 106 that is removed is directly below the waveguide 114. The etched-out portion 203 is a void, aperture, or vacuum within the insulator layer 106. For example, the portion of the insulator layer 106 is removed using, for example, a buffered oxide etch (BOE), which is applied through the slots 206 and 207. BOE is a wet etchant used in microfabrication to etch the oxide within the portion of the insulator layer 106 below the waveguide 114.

In an embodiment, a height 219 of the portion of the insulator layer 106 that is removed in the y-axis, and thus the height 219 of the etched-out portion 203, is equal to the height of the insulator layer 106. The height 219 of the etched-out portion 203 extends from the bottom edge of the SOI layer 109 to the top edge of the base semiconductor layer 103. The depth 218 of the portion of the insulator layer 106 that is removed in the z-axis, and thus the depth 218 of the etched-out portion 203, may be greater than or equal to the depth of the waveguide 114. In an embodiment, a width 220 of portion of the insulator layer 106 that is removed along the x-axis, and thus the width 220 of the etched-out portion 203, may be greater than or equal to the width 225 of the waveguide 114.

As shown in FIG. 2, the width 220 of the etched-out portion 203, and thus also the portion of the insulator layer 106 that is removed, may be slightly wider than the width 225 of the waveguide 114. Similarly, the depth 218 of the etched-out portion 203, and thus also the portion of the insulator layer 106 that is removed, may also be slightly larger than the depth of the waveguide 114. The height 219 of the etched-out portion 203, and thus also the portion of the insulator layer 106 that is removed, may be substantially equal to the height of the insulator layer 106. In some embodiments, the width 220 and the depth 218 of the etched-out portion 203 may be any width and depth, respectively, as long as the etched-out portion 203 is disposed below the waveguide 114 such that the waveguide 114 is positioned in the center of the etched-out portion 203. In some embodiments, the width 220 of the etched-out portion 203 may not be wide enough to extend below another waveguide disposed on the SOI layer 109. Similarly, the depth 218 of the etched-out portion 203 may not be deep enough to extend below another waveguide disposed on the SOI layer 109.

The etched-out portion 203 may create a vacuum which is substantially gasless. Therefore, heat is substantially incapable of passing through the etched-out portion 203 of the SOI wafer 200 or resistance to the heat passage through the etched-out portion 203 is significantly increased. In one embodiment, the vacuum may be a reduced pressure gas environment such as a nitrogen environment. The SOI wafer 200 including the etched-out portion 203 is thermally efficient relative to the waveguide 114. This is because when the resistive heater 123 applies heat to the SOI wafer 200 and the heat travels vertically downwards in the y-axis, the heat that would normally transfer from the waveguide 114 into the insulator layer 106 can no longer do so because of the positioning of the etched-out portion 203. That is, heat cannot easily dissipate from the waveguide 114 into the insulator layer 106 in the SOI wafer 200 because the etched-out portion 203 is positioned directly below the waveguide 114 and the etched-out portion 203 may not receive heat. In this way, the waveguide 114 in SOI wafer 200 may retain more heat without the need to use as much power to initiate the resistive heater 123.

Figure 3A:
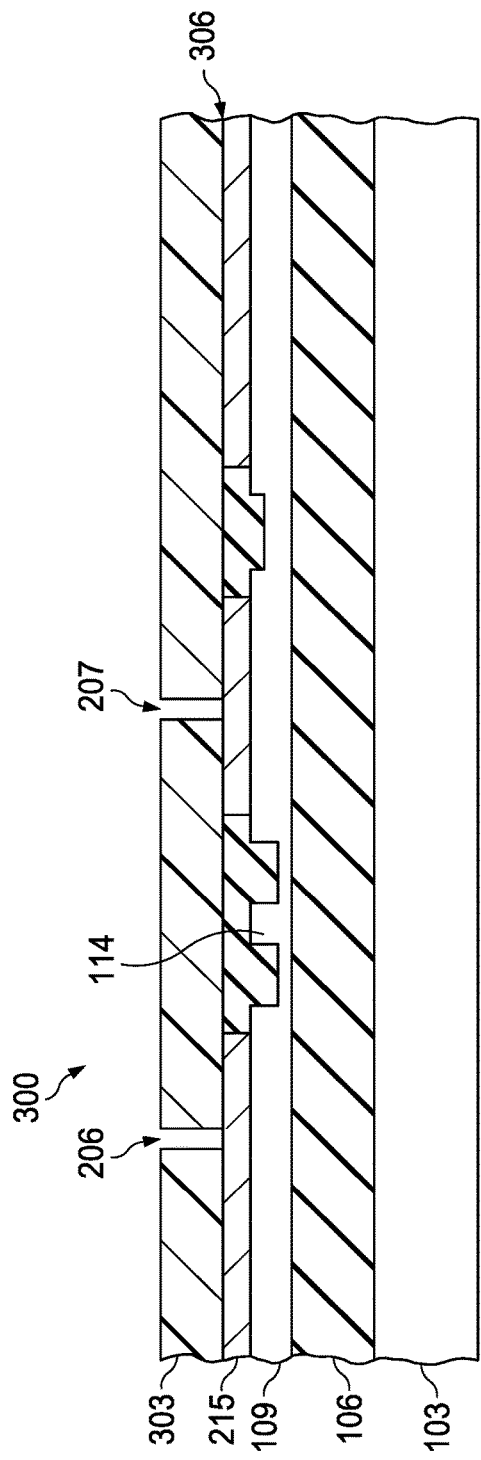
FIGS. 3A-3C collectively illustrate an embodiment of a method of fabricating of a portion of a SOI wafer included in a PIC according to an embodiment of the disclosure.
Figure 3B:
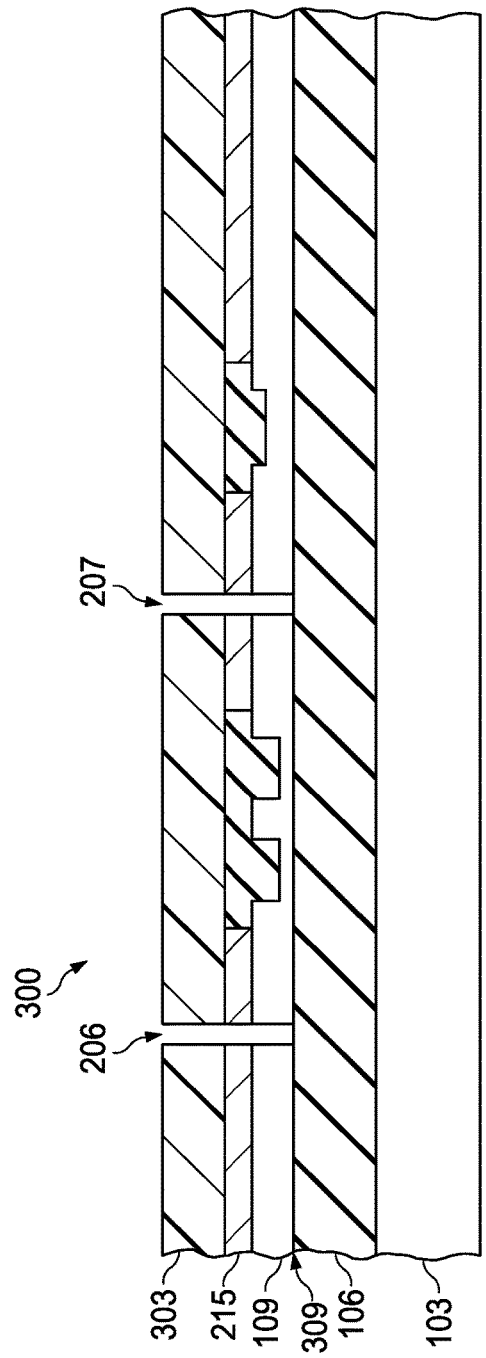
Figure 3C:
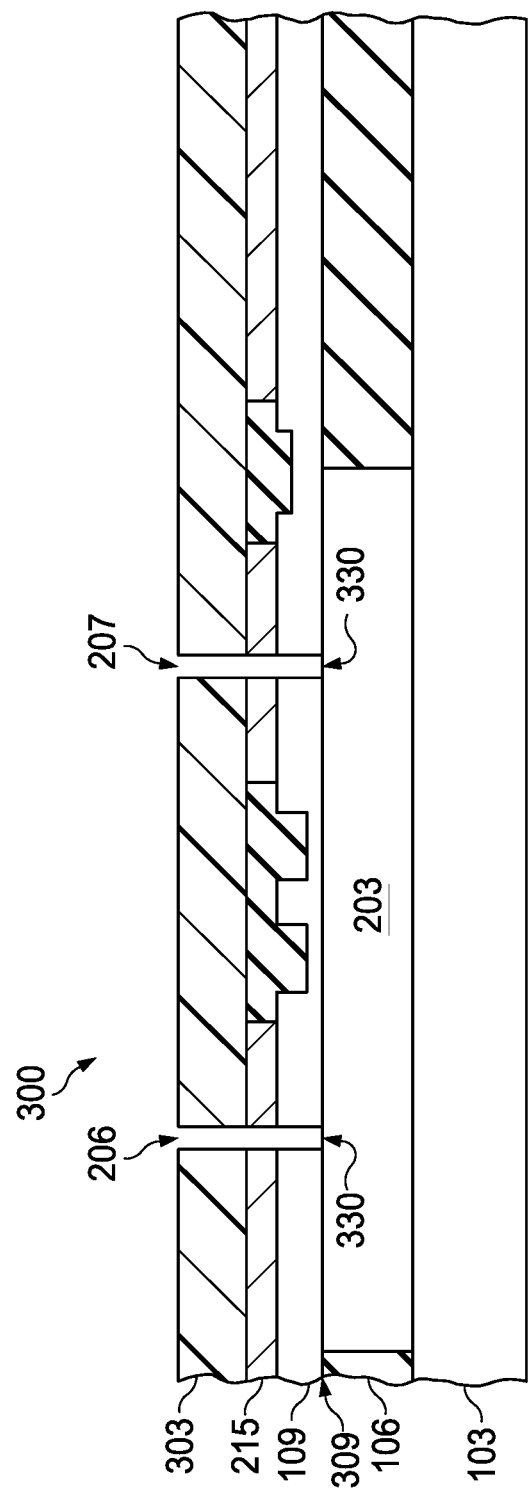

FIGS. 3A-3C collectively illustrate an embodiment of a method of fabricating of a portion of a SOI wafer 300 included in a PIC according to an embodiment of the disclosure. For illustration purposes, the method shown in FIGS. 3A-3C illustrates the fabrication of a single etched-out portion 203 under a single waveguide 114. However, the method shown in FIGS. 3A-3C is suitable for fabricating any number of etched-out portions 203 under different waveguides 114.

FIG. 3A is a cross sectional view of a portion of the SOI wafer 300 according to an embodiment of the disclosure that shows the first step of fabricating of a portion of a SOI wafer 300. SOI wafer 300 is similar to SOI wafer 200, except that SOI 300 additionally includes a PR coating 303. The PR coating 303 is disposed on top of the polysilicon layer 215 to include a pattern that defines the waveguide 114 and the slots 206 and 207. As shown in FIG. 3A, the slots 206 and 207 are also positioned within the PR coating 303. The slots 206 and 207 shown in FIG. 3A are formed using, for example, a dry etch process, such as RIE, that etches the slots 206 and 207 through the bottom edge 306 of the PR coating 303.

FIG. 3B is the cross sectional view of the portion of a SOI wafer 300 according to an embodiment of the disclosure after the slots 206 and 207 are formed through the PR coating 303. In FIG. 3B, the slots 206 and 207 are extended down into the polysilicon layer 215 and the SOI layer 109. For example, the slots 206 and 207 shown in FIG. 3B are extended downward in the y-axis using a dry etch process, such as RIE, that etches the slots 206 and 207 through the polysilicon layer 215 and the SOI layer 109. In an embodiment, the slots 206 and 207 are extended down to the top edge 309 of the insulator layer 106 to facilitate removal of the portion of the insulator layer 106.

FIG. 3C is the cross sectional view of the portion of a SOI wafer 300 according to an embodiment of the disclosure after the slots 206 and 207 are formed through the PR coating 303, polysilicon layer 215, and SOI layer 109. In FIG. 3C, a bottom edge 330 of the slot 206 and a bottom edge 330 of the slot 207 may abut against the top edge 309 of the insulator layer 106 to facilitate removal of the etched-out portion 203. For example, the portion of the insulator layer 106 may be removed via the slots 206 and 207 using a wet etching process, such as BOE. It should be appreciated that any etchant may be used to remove the portion of the insulator layer 106 to create the etched-out portion 203 so long as the etchant does not remove any portion of the base semiconductor layer 103 or the SOI layer 109.

Figure 4:
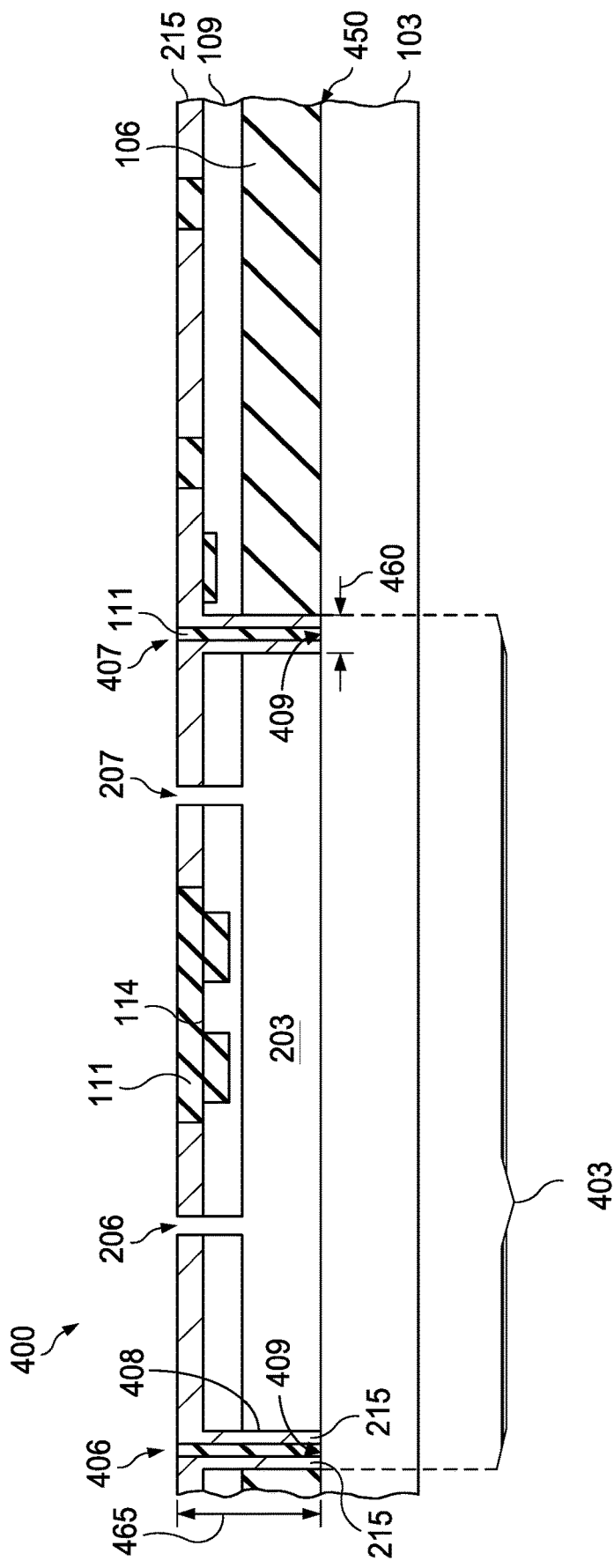
FIG. 4 is a cross sectional view of a portion of a SOI wafer that enables thermal efficiency according to another embodiment of the disclosure.

FIG. 4 is a cross sectional view of a portion of a SOI wafer 400 that enables thermal efficiency according to another embodiment of the disclosure. For example, SOI wafer 400 is a cross sectional view of a portion of the SOI wafer 100 after patterning and etching to remove the etched-out portion 203, the slots 206 and 207, and the outer slots 406 and 407. The SOI wafer 400 is similar to SOI wafer 200 in that SOI wafer 400 includes the base semiconductor layer 103, the insulator layer 106, the SOI layer 109, the polysilicon layer 215, and various cladding layers 111. The SOI wafer 400 also includes the etched-out portion 203. For example, the waveguide 114 is covered by a cladding layer 111 of a certain thickness such that the optical mode residing in the waveguide 114 is not disturbed by the polysilicon layer 215. Unlike SOI wafer 200, the SOI wafer 400 includes an enclosure 403, which may be formed using the outer slots 406 and 407.

In an embodiment, the outer slots 406 and 407 are similar to the slots 206 and 207 in that the outer slots 406 and 407 are holes or apertures that are patterned into the SOI layer 109. However, unlike the slots 206 and 207, the outer slots 406 and 407 are etched all the way down to the bottom edge of the insulator layer 106 or a top edge 450 of the base semiconductor layer 103. As shown in FIG. 4, outer slots 406 and 407 have sidewalls 408 which extend vertically along the y-axis from the top surface of the SOI wafer 400 to the bottom surface of the insulator layer 106 or a top edge 450 of the base semiconductor layer 103. The bottom edge 409 of outer slot 406 abuts a top edge 450 of the base semiconductor layer 103. Similarly, the bottom edge 409 of the outer slot 407 abuts a top edge 450 of the base semiconductor layer 103.

As shown in FIG. 4, the outer slots 406 and 407 are positioned a predefined distance from the waveguide 114 and the slots 206 and 207. In an embodiment, the outer slots 406 and 407 are placed an equal distance from the waveguide 114 and on either side of the waveguide 114. In this embodiment, the outer slot 406 may be placed a predefined distance from the slot 206 away from the waveguide 114. Similarly, the outer slot 407 may be placed a predefined distance from the slot 207 away from the waveguide 114. In an embodiment, the slots 206 and 207 are positioned in a manner to facilitate enclosing the etched-out portion 203 such that a wet etchant used to etch out the portion of the insulator layer 106 does not etch out any portion of the insulator layer 106 that extends beyond the outer slots 406 and 407.

In some embodiments, the diameter 460 of the outer slots 406 and 407 may be wide enough so that dry etch radicals may reach the base semiconductor layer 103 and so that the reaction by-product may leave through the outer slots 406 and 407. The diameter 460 of the outer slots 406 and 407 may also be wide enough so that the outer slots 406 and 407 may be resealed by an oxide deposition. For example, the diameter 460 of the outer slots 406 and 407 in the x-axis is about 500 nm. In some embodiments, the height 465 of the outer slots 406 and 407 may be substantially equivalent to the height of the polysilicon layer 215, the SOI layer 109, and the insulator layer 106.

In an embodiment, the outer slots 406 and 407 are formed of the polysilicon layer 215. For example, the polysilicon material forming the polysilicon layer 215 may be deposited into the outer slots 406 and 407 after the outer slots 406 and 407 have been etched-out of the SOI layer 109 and the insulator layer 106. As shown in FIG. 4, a thin cladding layer 111 may also be present in between two polysilicon layers 215 in the outer slots 406 and 407.

In an embodiment, the enclosure 403 includes the etched-out portion 203, which is enclosed by the polysilicon layer 215 present in the outer slots 406 and 407. In this way, the enclosure 403 at least partially encloses the area of the insulator layer 106 directly under the waveguide 114. In an embodiment, the enclosure 403 is provided using the outer slots 406 and 407 before removing the portion of the insulator layer 106 to create the etched-out portion 203. This is because the enclosure 403 creates a boundary that may be used by the wet etchant to remove the portion of the insulator layer 106 under the waveguide 114 to create the etched-out portion 203. In this way, the wet etchant may be prevented by the enclosure 403, or the polysilicon layer 215 filled outer slots 406 and 407, from spilling over into outer areas of the insulator layer 106 and removing unnecessary portions of the insulator layer 106. For example, the insulator layer 106 should be etched-out carefully to ensure that portions of the insulator layer 106 that are under other waveguides should not be removed. In this case, it may be beneficial to use the SOI wafer 400 to facilitate blocking the wet etchant from removing those portions of the insulator layer 106 that are used for other components of the PIC.

Figure 5C:
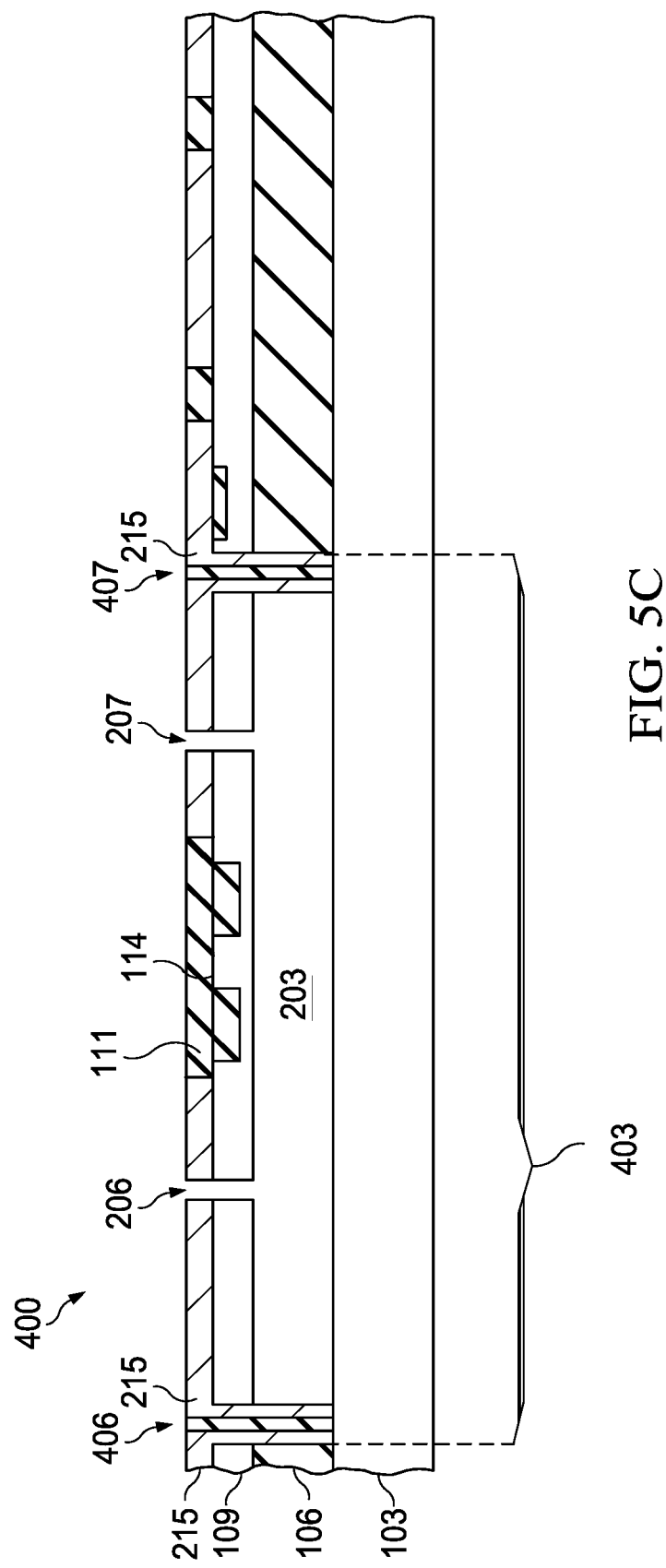

FIGS. 5A-5C collectively illustrate another method for fabricating a PIC with an SOI wafer 400. For illustration purposes, the method shown in FIGS. 5A-5C illustrates the fabrication of a single etched-out portion 203 under a single waveguide 114 having a single enclosure 403. However, the method shown in FIGS. 5A-5C is suitable for fabricating any number of etched-out portions 203 under different waveguides 114, each having a different enclosure 403.

FIG. 5A is a cross-sectional view of a portion of the SOI wafer 400 according to an embodiment of the disclosure showing the first step of fabricating a PIC with an SOI wafer 400. As shown in FIG. 5A, the outer slots 406 and 407 are positioned within the SOI layer 109 and the insulator layer 106. For example, the outer slots 406 and 407 may be formed using a dry etch process, such as RIE, that etches the outer slots 406 and 407 through the SOI layer 109 and the insulator layer 106. Unlike the slots 206 and 207, the outer slots 406 and 407 extend down to the bottom edge of the insulator layer 106 to reach a top edge 450 of the base semiconductor layer 103.

FIG. 5B is a cross-sectional view of a portion of the SOI wafer 400 according to an embodiment of the disclosure after etching the outer slots 406 and 407 into the SOI wafer 400. As shown in FIB. 5B, the polysilicon layer 215 is deposited on top of the SOI layer 109 and cladding layers 111. In an embodiment, the cladding layer 111 may separate the waveguide 114 from the polysilicon layer 215. As shown in FIG. 5B, the polysilicon layer 215 is also deposited into the outer slots 406 and 407. After the polysilicon layer 215 is deposited into the outer slots 406 and 407, the enclosure 403 is formed.

FIG. 5C is a cross-sectional view of a portion of the SOI wafer 400 according to an embodiment of the disclosure after etching the enclosure 403 is formed in the SOI wafer 400. The slots 206 and 207 are also formed into the polysilicon layer 215 and SOI layer 109. For example, the slots 206 and 207 may be formed using a dry etch process, such as RIE, that etches the slots 206 and 207 through the polysilicon layer 215 and the SOI layer 109. In an embodiment, the slots 206 and 207 are extended down to the surface of the insulator layer 106 to facilitate removal of the portion of the insulator layer 106.

As shown in FIG. 5C, the portion of the insulator layer 106 that is enclosed within the enclosure 403 is removed to form the etched-out portion of the SOI wafer 400. For example, the portion of the insulator layer 106 may be removed via the slots 206 and 207 using a wet etching process, such as BOE. In this embodiment, the wet etching process is performed more accurately due to the enclosure 403, which prevents the wet etchant from removing any part of the insulator layer 106 that extends outside of the enclosure 403 or beyond the outer slots 406 and 407. This is because the wet etchant, such as BOE, has a high selectivity and may only etch oxides present in the insulator layer 106. That is, the wet etchant may not be able to etch the polysilicon material in the polysilicon layer 215 present in the outer slots 406 and 407. It should be appreciated that any etchant may be used to remove the portion of the insulator layer 106 to create the etched-out portion 203 so long as the etchant does not remove any portion of the base semiconductor layer 103 or the SOI layer 109.

Figure 6:
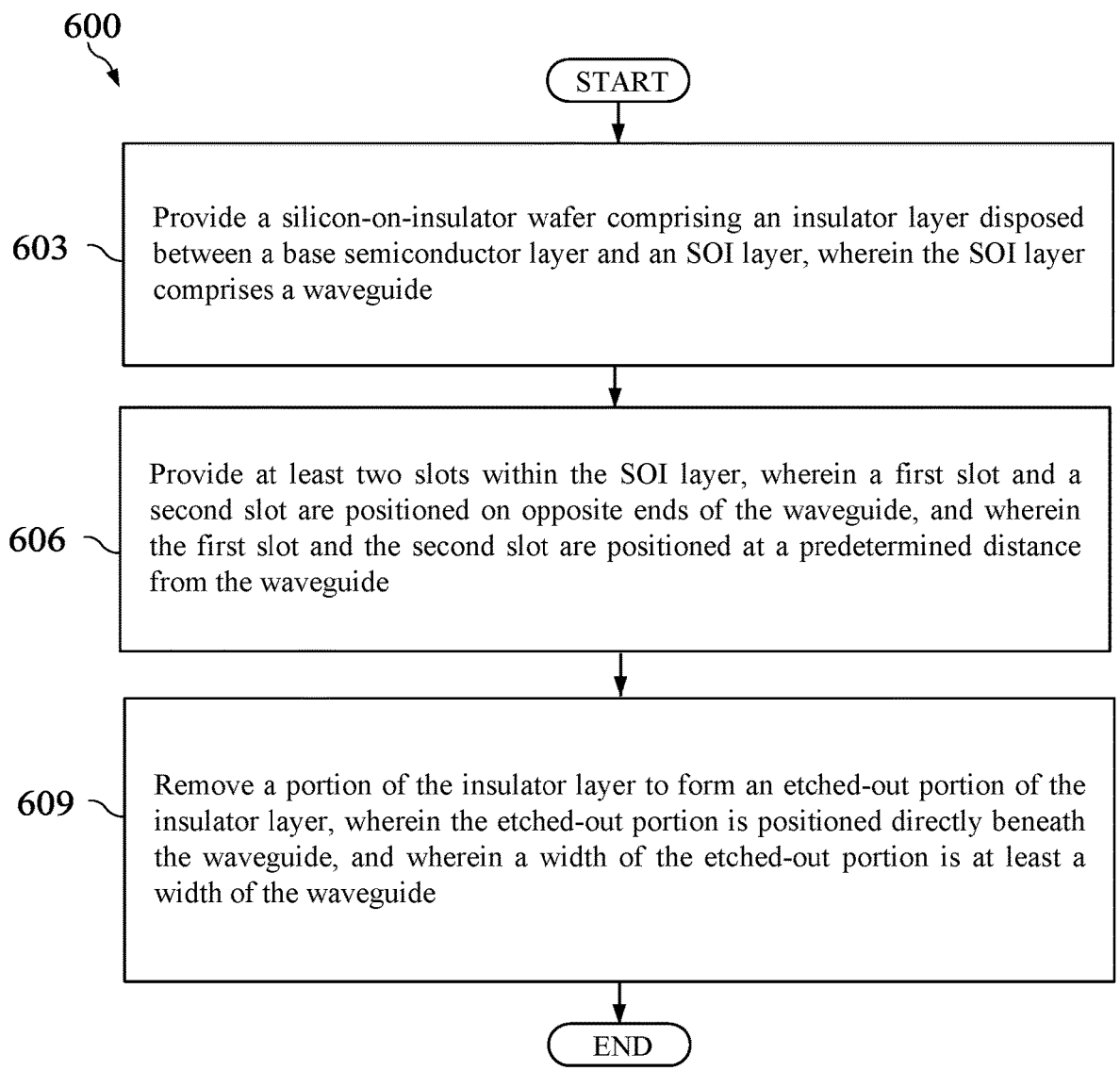
FIG. 6 is a flowchart of a method for fabricating a SOI wafer on a PIC according to various embodiments of the disclosure.

FIG. 6 is a flowchart of a method 600 for fabricating an SOI wafer on a PIC according to various embodiments of the disclosure. The SOI wafer may be any one of SOI wafers 200 or 400. The method 600 may be implemented by a semiconductor manufacturer that is capable of manufacturing SOI PICs. The method 600 is implemented during fabrication of the SOI wafers disclosed herein.

At step 603, an SOI wafer is provided for fabrication. The SOI wafer may include an insulator layer 106 positioned between a base semiconductor layer 103 and a SOI layer 109. In an embodiment, the SOI layer 109 may comprise a waveguide 114, which is formed by etching out portions 117A and 117B of the SOI layer 109 around the waveguide 114.

At step 606, two slots 206 and 207 are provided within the SOI layer 109. For example, the slots 206 and 207 may be provided using the dry etching process, as described above with reference to FIGS. 3A-3C. In an embodiment, the first slot 206 and the second slot 207 are positioned on opposite sides of the waveguide 114. In an embodiment, the first slot 206 and second slot 207 are posited at a predetermined distance away from the waveguide 114. In an embodiment, the first slot and the second slot extend vertically from a top surface of the SOI wafer to a top surface of the insulator layer 106.

At step 609, a portion of the insulator layer 106 is removed to form the etched-out portion 203 of the insulator layer 106. In an embodiment, the portion of the insulator layer 106 is removed using a wet etching process, as described above with reference to FIGS. 3A-3C. In an embodiment, the etched-out portion 203 is positioned directly beneath the waveguide 114. In an embodiment, a width of the etched-out portion 203 is at least the width of the waveguide 114.

In some embodiments, the method 600 may further include a step between step 606 and step 609 in which two outer slots 406 and 407 are provided into the SOI layer 109 and the insulator layer 106. As described above with reference to FIGS. 4A-4C, the two outer slots 406 and 407 may be formed using a dry etching process. In an embodiment, the two outer slots 406 and 407 may be positioned outside the slots 206 and 207 relative to the waveguide 114. In an embodiment, a polysilicon layer 215 may be deposited on top of the SOI layer 109 and the polysilicon layer 215 may be deposited into the outer slots 406 and 407 to form the enclosure 403.

Figure 7:
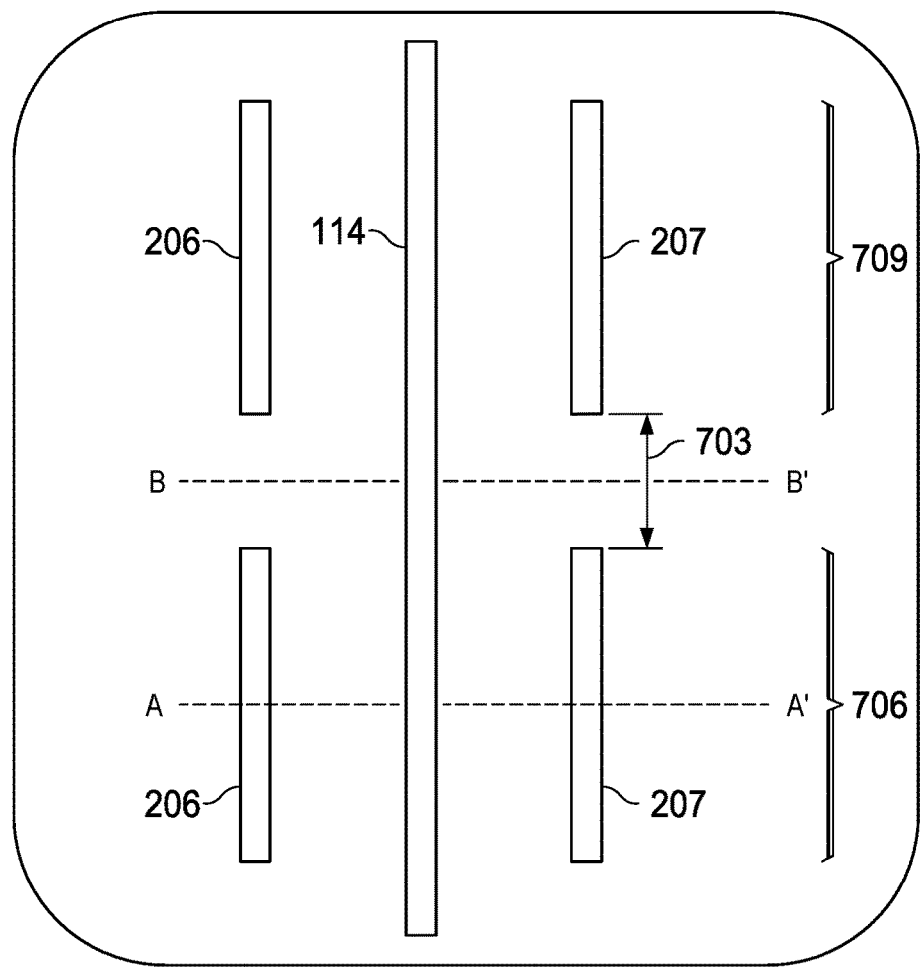
FIG. 7 is a top view of a portion of a SOI wafer that enables thermal efficiency according to an embodiment of the disclosure.
Figure 7:
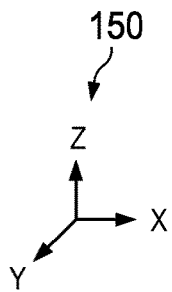

FIG. 7 is a top view of a portion of a SOI wafer 700 that enables thermal efficiency according to an embodiment of the disclosure. As defined by the legend 150, the z-axis is along an optical propagation axis of the waveguide 114. The x-axis is substantially parallel to a plane of the SOI wafer 700. The y-axis is substantially perpendicular to the plane of the SOI wafer 700. The SOI wafer 700 may be the SOI wafer 200 or the SOI wafer 400 according to various embodiments of the disclosure.

As shown in FIG. 7, the slots 206 and 207 are not continuous along the z-axis, while the waveguide 114 is continuous along the z-axis. For example, portion 703 of the SOI wafer 700 may not include a slot, and therefore, the insulator layer 106 underneath portion 703 may not be etched-out. In this way, the etched-out portion 203 may be subdivided into various sections based on where the slots 206 and 207 are positioned. For example, the etched-out portion 203 may be subdivided into two sections in the portion of the SOI wafer 700, the first section corresponding to the first set of slots 706, and the second section corresponding to the second set of slots 709. The portion 703 of the SOI wafer 700 without the slots may provide a mechanical support to the suspended structure.

Figure 8:
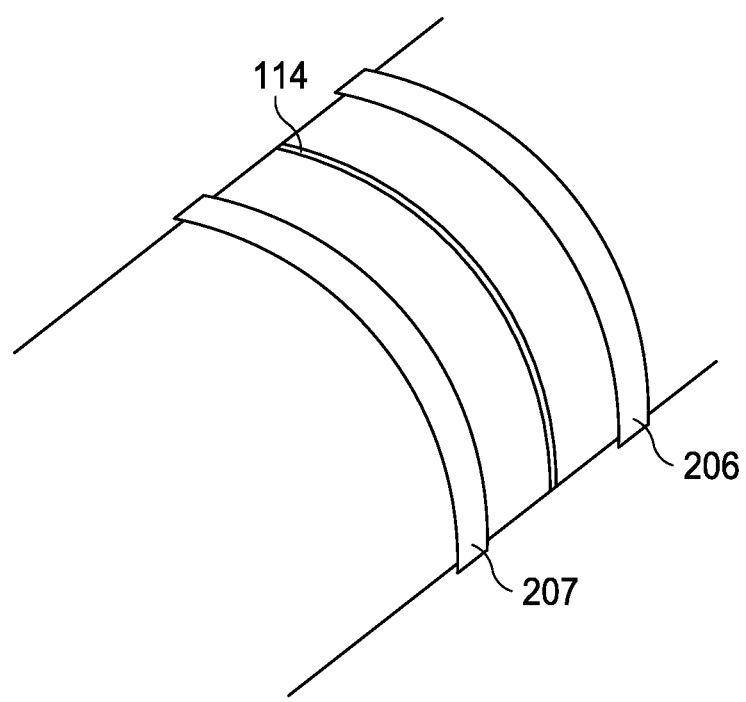
FIG. 8 is a top view of a portion of a SOI wafer that enables thermal efficiency according to an embodiment of the disclosure

FIG. 8 is a top view of a portion of a SOI wafer 800 that enables thermal efficiency according to an embodiment of the disclosure. The SOI wafer 800 is similar to the SOI wafer 200, 400, and 700, except that the SOI wafer 800 includes a curved waveguide 114. In the embodiment in which the waveguide 114 is curved, each of the layers of the SOI wafer 700 may also be curved. For example, the PR coating 303, the polysilicon layer 215, the SOI layer 109, and/or the insulator layer 106 may also be curved to align with the curved waveguide 114. The cladding layer 111 that is deposited above the waveguide 114 may be curved at least on one edge to accommodate the curved waveguide 114.

As shown in FIG. 8, the slots 207 and 206 may also be curved to align with the curved waveguide 114. In this embodiment, the portion of the insulator layer 106 that is removed may be curved at least on the edge that faces the curved waveguide 114. In this way, the etched-out portion 203 may also be curved at least on the edge that faces the curved waveguide 114. In one embodiment, only the edge of the etched-out portion 203 that faces the curved waveguide 114 may be curved. In one embodiment, any edge of the etched-out portion 203 may be curved.

In some embodiments, the inclusion of the etched-out portion 203 and the enclosure 403 may not have any negative effects on the propagation of light throughout the PIC comprising any of the SOI wafers 200 or 400 disclosed herein. The embodiments disclosed herein provide a simple and controllable mechanism to provide thermal efficiency to SOI wafers. The etched-out portion 203, or the removal of the portion of the insulator layer 106, reduces the buckling chance of the SOI wafer.

The use of the term "substantially" means a range including ±10% of the subsequent modifier, unless otherwise stated. While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, units, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A photonic integrated circuit (PIC) for an optical device, comprising:
    a base semiconductor layer;
    an insulator layer disposed on the base semiconductor layer, the insulator layer comprising an etched-out portion, which forms a hollow aperture within the insulator layer; and
    a silicon-on-insulator (SOI) layer disposed on the insulator layer and comprising a top surface, a bottom surface, and a waveguide, the etched-out portion of the insulator layer being positioned adjacent to the bottom surface of the SOI layer, the top surface of the SOI layer being etched out to form the waveguide such that the waveguide is positioned above the etched-out portion of the insulator layer, a width of the etched-out portion being greater than or equal to a width of the waveguide.

2. The PIC of claim 1, further comprising:
a cladding layer disposed on the SOI layer; and
a heater disposed on the cladding layer, the heater configured to heat the waveguide.

3. The PIC of claim 1, wherein the SOI layer comprises a slot laterally-adjacent to the waveguide.

4. The PIC of claim 1, wherein the SOI layer comprises slots disposed on either side of the waveguide.

5. The PIC of claim 1, wherein the etched-out portion comprises a vacuum configured to inhibit heat from passing through the etched-out portion.

6. The PIC of claim 1, wherein the SOI layer comprises slots disposed on either side of the waveguide, and wherein the SOI layer and the insulator layer comprise outer slots disposed on either side of the slots.

7. The PIC of claim 6, wherein the outer slots comprise a first outer slot and a second outer slot each disposed a second predetermined distance from the waveguide.

8. An apparatus, comprising:
a base semiconductor layer;
an insulator layer disposed on the base semiconductor layer, the insulator layer comprising an etched-out portion, which forms a hollow aperture within the insulator layer;
a silicon-on-insulator (SOI) layer disposed on the insulator layer and comprising a top surface, a bottom surface, and a waveguide, the etched-out portion of the insulator layer being positioned adjacent to the bottom surface of the SOI layer, the top surface of the SOI layer being etched out to form the waveguide such that the waveguide is positioned above the etched-out portion of the insulator layer, a width of the etched-out portion being greater than or equal to a width of the waveguide; and
a polysilicon layer disposed on the SOI layer.

9. The apparatus of claim 8, wherein a height of the etched-out portion is equal to a height of the insulator layer, and wherein a depth of the etched-out portion is greater than or equal to a depth of the waveguide.

10. The apparatus of claim 8, further comprising at least two outer slots disposed within the SOI layer and the insulator layer on either side of the waveguide.

11. The apparatus of claim 10, wherein the at least two outer slots comprise polysilicon.

12. The apparatus of claim 10, wherein the at least two outer slots each comprise two silicon layers and a cladding layer disposed between the two silicon layers.

13. The apparatus of claim 8, further comprising:
a cladding layer disposed on the SOI layer; and
a heater disposed on the cladding layer, the heater is configured to heat the waveguide when a current is applied to the heater.

14. The apparatus of claim 8, further comprising two slots disposed within the SOI layer on either side of the waveguide at a predetermined distance from the waveguide.

15. A photonic integrated circuit (PIC) for an optical device, comprising:
a base semiconductor layer;
an insulator layer disposed on the base semiconductor layer, the insulator layer comprising an etched-out portion, which forms a hollow aperture within the insulator layer; and
a silicon-on-insulator (SOI) layer disposed on the insulator layer and comprising a top surface, a bottom surface, and a waveguide, the SOI layer comprising a slot laterally-adjacent to the waveguide, the top surface of the SOI layer being etched out to form the waveguide such that the waveguide is positioned above the etched-out portion of the insulator layer, the etched-out portion of the insulator layer being positioned adjacent the bottom surface of the SOI layer, a width of the etched-out portion being greater than or equal to a width of the waveguide.

16. The PIC of claim 15, wherein the slot is disposed at a predefined distance from the waveguide.

17. The PIC of claim 15, further comprising a polysilicon layer is disposed on the SOI layer, and wherein the slot extends through the polysilicon layer and the SOI layer and is spaced apart from the waveguide by a predetermined distance.

18. The PIC of claim 15, further comprising:
a cladding layer disposed on the SOI layer; and
a heater disposed on the cladding layer, the heater configured to heat the waveguide when a current is passed through the heater.

19. The PIC of claim 15, further comprising at least two outer slots disposed within the SOI layer and the insulator layer on either side of the waveguide.

20. The PIC of claim 15, wherein a height of the etched-out portion is a height of the insulator layer, and wherein a depth of the etched-out portion is greater than or equal to a depth of the waveguide.

* * * * *